United States Patent Office 2,861,768
Patented Nov. 25, 1958

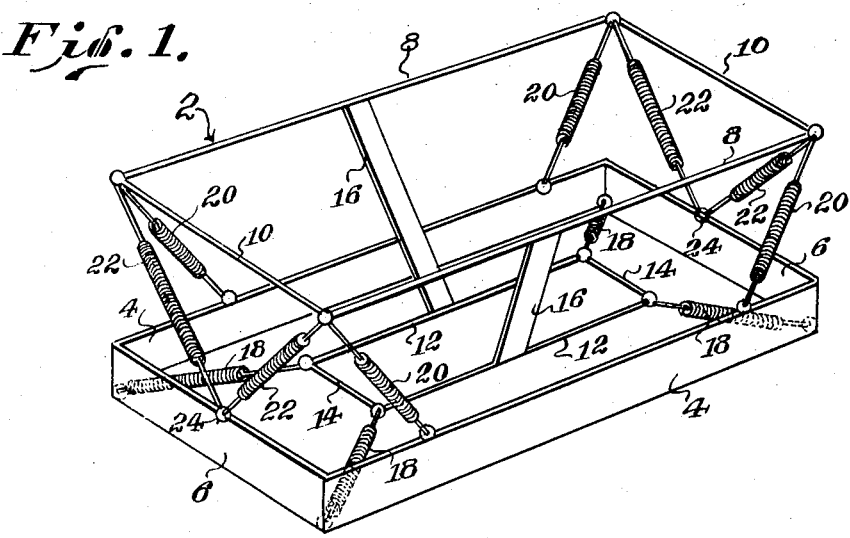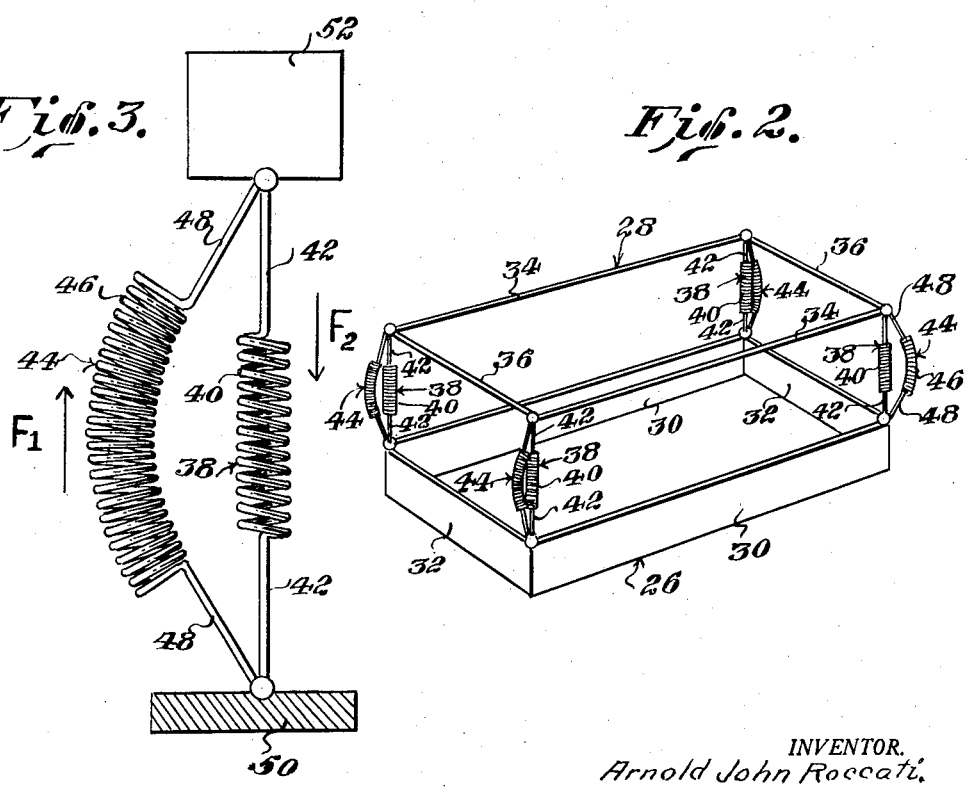

2,861,768

VIBRATION ISOLATION SYSTEM AND INSTRUMENT MOUNT

Arnold John Roccati, Rockville, Md., assignor, by mesne assignments, to Vitro Corporation of America, New York, N. Y., a corporation of Delaware Application December 17, 1956, Serial No. 628,691

3 Claims. (Cl. 248—358)

This invention relates to a means for isolating vibrations below the range of normal isolation mounts without the excessive deflection common to ordinary mounts, and an instrument mount in which such means is used.

The principal object of this invention is to provide a vibration isolation system which comprises one or more units each of which includes a plurality of springs, one being a constant force spring operating in compression over the central portion of its range and utilized as the main load carrying member, and another being a linear spring operating in tension to control the load.

A further object of this invention is to provide a vibration isolation system capable of supporting a delicate instrument such as a tracking telescope on an aircraft.

A still further object of this invention is to provide a means of controlling and isolating low frequency vibrations.

Other objects of the invention will appear hereinafter throughout the specification.

Referring to the drawing:

Figure 1 is an isometric view of a telescope mount in which a plurality of sets of compression and tension springs are used.

Figure 2 is an isometric view of a mount similar to Figure 1 but showing another form of spring arrangement; and Figure 3 is a side elevation of one of the spring mounts used in Figure 2.

Referring now to Figure 1 of the drawing, 2 represents the vibration isolation mount of this figure in its entirety. This mount comprises a rectangular base having sides 4 and ends 6, and an instrument carrying member made up of two spaced rectangular frames of different sizes arranged in different horizontal planes. The larger and uppermost of these frames has substantially the same lateral extent as the base and comprises the sides 8 and the ends 10. The smaller frame is made up of the sides 12 and the ends 14 and is connected midway of its length to the larger frame by the bars 16. The instrument carrying member is supported above the base by a plurality of compression and tension springs arranged between the sides and ends of the base and the instrument carrying member. The tension springs are represented at 18 and are four in number, one being connected to each corner of the base and extending toward and connected to the adjacent corner of the smaller frame. The compression springs are eight in number, one pair being connected to and extending downwardly from each of the four corners of the larger frame. One spring 20 of each pair of the compression springs is connected at one end to the adjacent side of the base at a point spaced from the corner, and the other 22 is connected to the adjacent end of the base midway between its ends at 24.

The form of Figure 2 is similar to that of Figure 3 in that it has a rectangular base 26 and a rectangular supporting frame 28 yieldably carried above the base by a plurality of tension and compression springs arranged in pairs. The base 26 has the sides 30 and ends 32 while the frame 28 has side bars 34 and end bars 36. The springs are arranged with a pair connecting each corner of the base with the corresponding corner of the supporting frame. One spring 38 of each pair is a tension spring which comprises a central coiled portion 40 and straight end portions 42. The other spring 44 of each pair is a compression spring normally held in a bowed condition when in its operative position by the tension spring 38 and the supporting frame 28 and its load. The spring 44 has a central coiled portion 46 and straight end portions 48.

Figure 3 shows a single pair of the springs used in the form of mount shown in Figure 2 but on an enlarged scale, and represents the basic principle of the invention. In this figure, 50 represents the base to which the springs are attached at their lower ends, and 52 the load which is supported by the springs. It will be noted that the end portions 48 of the springs 44 project from the same side of the coiled portion 46 so that when the force of the tension spring 38 is applied, the coiled portion 46 will be bowed as shown in Figures 2 and 3. Of course a further deformation will occur when a load is applied. The springs may be attached to each other or to the load supporting member by any suitable means and preferably by a pivot means where there is any appreciable angular movement between the springs.

The natural frequency of an isolation system is given by the equation:

$$f_n = \frac{1}{2\pi}\sqrt{\frac{kg}{w}}$$

where $k$ is the spring rate of the isolation at load $w$, and $g$ is the acceleration due to gravity. Therefore, isolation from very low exciting frequencies demands a very small spring rate and/or a heavy mass. In ordinary systems these two requirements are not compatible since an excessive no-load to static-load results. This invention is designed to eliminate this problem. Since the force $F_1$ in Figure 3 is constant regardless of deflection over the operating range, $F_1$ may be chosen such that it supports the load without excessive deflection and it will not affect the spring rate of the system. The spring rate of the force $F_2$ determines the natural frequency of the system; however, it does not have to carry the static load. It should be noted that the entire supported mass is considered as acting on $F_2$ when the system is excited since the force $F_1$ does not change with deflection. This property enables the system to provide isolation against frequencies much lower than ordinary mounts.

In the past, the control and isolation of low frequency vibrations, those below 8 C. P. S., has been very difficult if not impossible. This invention provides a means of isolating these frequencies, and in addition the large no-load to static load deflection of ordinary systems is eliminated.

While the mounts of Figures 1 and 2 have been illustrated as being rectangular in form, it will be understood that any other suitable form may be used. Also, if due to excessive load, the supporting frame of Figure 2 would have a tendency to move laterally with respect to the base, any suitable means may be used to guide the frame to and from the base.

The above description and drawing disclose two embodiments of the invention, and specific language has been employed in describing the figures. It will, nevertheless, be understood that no limitations of the scope of the invention are thereby contemplated, and that various alterations and modifications may be made as would occur to one skilled in the art to which the invention relates.

I claim:

1. An instrument mount comprising a substantially rectangular base, a substantially rectangular supporting means arranged in spaced relation to and above said base, a plurality of elongated spring means yieldably supporting said supporting means in a plane above said base, said spring means being mounted at opposite sides of said mount, each of said spring means comprising a pair of compression springs arranged at each corner of said mount, the springs of each pair each being connected at one end to the adjacent corner portion of said supporting means and at its other end to a side of said base at a point spaced from the adjacent corner, said spring means also including a tension spring extending between and connected at its ends to the adjacent corners of said base and said supporting means.

2. An instrument mount as defined in claim 1, wherein said supporting means comprises two rigidly connected frame members of different sizes arranged in spaced horizontal planes with the larger frame member above the smaller frame member.

3. An instrument mount as defined in claim 2, wherein the lateral extent of said larger frame member is substantially equal to that of said base and is symmetrically arranged with relation thereto, and all of said springs are coil springs.

References Cited in the file of this patent

UNITED STATES PATENTS 438,941   Pepple _____ Oct. 21, 1890